United States Patent [19]
Booher, Jr.

[11] 3,988,866
[45] Nov. 2, 1976

[54] HIGH DENSITY CERAMIC TURBINE MEMBERS

[75] Inventor: Claude R. Booher, Jr., West Chester, Pa.

[73] Assignee: Westinghouse Electric Corporation, Pittsburgh, Pa.

[22] Filed: Mar. 25, 1975

[21] Appl. No.: 561,731

[52] U.S. Cl. .............................. 51/283; 29/156.8 B; 51/323; 29/90 R
[51] Int. Cl.² .................... B24B 1/00; B21K 3/04
[58] Field of Search .............. 51/283 R, 284 R, 323, 51/324, 283 E; 29/90, 156.8 B

[56] References Cited
UNITED STATES PATENTS

| | | | |
|---|---|---|---|
| 2,706,876 | 4/1955 | Levengood | 51/283 E |
| 2,959,843 | 11/1960 | Vitulugt | 29/156.8 B |
| 3,110,141 | 11/1963 | Dalgleish | 51/323 |
| 3,177,628 | 4/1965 | Highberg | 51/283 |
| 3,186,134 | 6/1965 | Bonin | 51/283 E |
| 3,371,908 | 3/1968 | Mito et al. | 29/156.8 B X |
| 3,805,459 | 4/1974 | Baksay | 51/323 X |

Primary Examiner—Al Lawrence Smith
Assistant Examiner—James G. Smith
Attorney, Agent, or Firm—G. H. Telfer

[57] ABSTRACT

A ceramic member for a gas turbine is produced by a method including, forming the member to the desired configuration by conventional means and then finishing it to the desired size by a surface finish and subsequently burnishing the surface to a highly polished finish of the order of 3 to 6 RMS, and rounding off the sharp edges to a small radius in the range of 0.010 to 0.020 inch. These finishing operations are performed in the direction in which the maximum stress is to be applied to the member in its use in the turbine.

3 Claims, 5 Drawing Figures

HIGH DENSITY CERAMIC TURBINE MEMBERS

The invention herein described was made in the course of or under a contract or subcontract thereunder, with the Department of Army.

BACKGROUND OF THE INVENTION

The present invention relates to ceramic members, and more particularly to the finish machining of high density ceramic members such as may be used for turbine components. The invention herein described was made in the course of or under a contract, or subcontract thereunder, with the Department of Defense.

High density ceramic materials such as hot pressed silicon nitride and silicon carbide have high strength and the ability to withstand high temperatures. These materials, therefore, are very desirable for components of gas turbines such as vanes, blades and supporting structures, since they permit operation at temperatures as high as 2500° F with resulting improved efficiency and performance of the turbine. Such parts are usually produced by hot pressing the material to the desired configuration and then machining to the exact final dimensions, usually by diamond grinding because of the hardness of the material. Diamond grinding, using a grinding wheel of 220 grit size, for example, is frequently specified for this finishing operation, but the surface finish to be obtained is usually not specified. The finish resulting from this usual practice, therefore, may have a surface roughness varying over a considerable range, which may be of the order of 20 to 50 RMS, depending on such factors as the type of coolant used, the grinding speed and the contact pressure. This conventional practice results in a surface having numerous surface defects such as cracks and scratches in the direction of grinding. The edges and corners are usually sharp, or essentially knife-edges, causing notches, chip-outs and other defects.

These high strength, high density ceramic materials are relatively brittle and are extremely sensitive to external and internal flaws of both microscopic and macroscopic size. In the use of such ceramic members, the maximum stress applied to the member very often occurs at or slightly beneath the surface, and flaws such as those mentioned above are likely to result in a catastrophic failure. Residual stresses are also often established in the vicinity of surface scratches because of temperature non-uniformities resulting from the grinding process. Such residual stresses add directly to the applied stresses and this is a serious problem in ceramic materials because these residual stresses cannot be relieved by creep or plastic flow as in materials such as metals.

Turbine components such as vanes, blades and shrouds are subjected to both steady-state and transient stress conditions in use, and these stresses are frequently tensile stresses and are very often at their maximum at the outer surface of the component. Ceramic materials usually have their greatest strength in compression and are relatively weaker in tension so that these surface tensile stresses are very critical. Surface defects in the materials such as those discussed above act as stress concentrations which add directly to the applied stresses and these stress concentrations can reduce the strength of the material by 40% to 50%. Obviously, such a reduction in strength cannot be tolerated in the design of these components. The same problem exists in the preparation of test specimens and if surface defects of this type exist on specimens for physical testing, they prevent accurate determination of the true mechanical properties of the material.

It has been believed that the detrimental effects of this surface damage and the residual tensile stresses will be reduced after many hours of operation at high temperature as in a gas turbine. However, adequate performance of the ceramic components must be obtained through severe modes of operation, such as installation, start-up and shut-down of the machine, prior to achieving the many hours of high temperature operation which might cause an improvement in the detrimental effects of the surface faults. Such a long delay in the attainment of the required strength, even if it occurs, cannot be considered acceptable performance.

It has also been thought that after a sufficient period of operation, the effects of surface finish of the ceramic parts will not be important because of the oxide film formed on the surface of the material. Such a film, however, does not really help the situation because mechanical differences, such as differences in thermal expansion, strength and elasticity between the oxide film and the ceramic material, are such that the film is very likely to craze and flake off so that it would not serve any useful purpose. Such crazing itself can induce cracks which readily propagate to scratches in the surface of the material and can precipitate a failure in this way. There are also, of course, highly stressed surface areas on which a protective coating of this kind cannot form or be retained, such as contact surfaces where any coating would be immediately ground off. The presence of surface defects of the kinds described above, therefore, which result in a reduction in the effective strength of the ceramic material, is not acceptable and their effects are not effectively obviated even after the ceramic part has been in service. The ceramic components for gas turbine use finished in the conventional manner are, therefore, not entirely satisfactory for exhibiting the ability to withstand the tensile stresses they are subjected to.

SUMMARY OF THE INVENTION

The present invention provides ceramic members which, because of the finishing characteristics, provides a very substantial improvement in the strength of high density ceramic material by reducing surface defects which otherwise cause substantial reductions in the ability of the ceramic component to withstand tensile stresses.

In accordance with the invention, the ceramic member is formed to the desired configuration by conventional means, such as by hot pressing, and is then machined to its final dimensions with the final finishing step consisting of burnishing the surface to a highly polished surface of the order of 3 to 6 RMS. The final machining and burnishing is also done on the edges thereby rounding or contouring the edges to a radius preferably in the range of 0.010 to 0.020 inch to eliminate any sharp edges. These finishing operations are performed on those surfaces of the component extending in the direction of the known tensile stress acting on the component in the direction in which the tensile stress is applied to the member in use. Surface flaws or defects of the type discussed above are eliminated by finishing the member in this way and a marked increase in the ability of the component to withstand the tensile stress is thus obtained.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
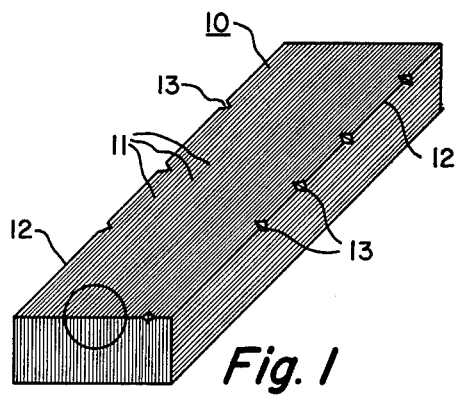
FIG. 1 is a view of a ceramic member illustrating the effects of the conventional method of surface finishing.
Figure 2:
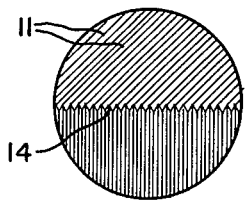
FIG. 2 is an enlarged view of a portion of an edge of the member of FIG. 1.

As discussed above, in the conventional ceramic members such as gas turbine components, are manufactured by initially forming the desired configuration of the component by hot pressing to obtain the desired high density and high strength, and then finish machining the component to its final dimensions by diamond grinding. The surface finish is not usually specified and the result is a component having numerous surface scratches or cracks and chip-outs, with sharp or knife-edges and sharp corners. Such a component is illustrated in FIG. 1 which shows a ceramic member 10 made in the manner just described. The member 10 is shown as a generally rectangular member such as would be provided for mechanical test purposes but it is to be regarded as representative of any desired ceramic component such as a gas turbine vane or a supporting block or end cap for such a vane. The defects are shown somewhat exaggerated in FIG. 1 for the sake of clarity, but it will be seen that the surface has numerous longitudinal scratches or cuts 11 extending in the direction of grinding both on the upper surface and on the side surfaces. It will also be seen that the intersections of the top and side surfaces form sharp knife-edges 12 which are susceptible to the occurrence of chip-outs as indicated at 13. The end of the member in the direction of grinding shows many notches and forms a serrated edge as indicated at 14 in the enlarged view of FIG. 2.

As previously discussed, these various surface defects act as stress concentrations and are frequently accompanied by residual stresses due to the temperature non-uniformities which occur during grinding. Ceramic components are very sensitive to such stress concentrations which greatly reduce their effective strength since they add directly to the applied stresses and cause failure or fracture at much lower applied stresses than would be the case in the absence of these defects when the full strength of the material would be available to support the applied forces. The importance of these surface defects and the extremely adverse effects on the strength of the material have apparently not been recognized heretofore, since the surface finish has not usually been considered important and specifications for ceramic components of this general type have specified only the diamond grit size without regard to the finish to be produced.

In accordance with the present invention, it has been found that a ceramic component with a very significant increase in the effective fracture strength can be obtained by finishing the surface of the component in a manner which eliminates the surface defects described above and which is carried out in the manner described herein.

Figure 3:
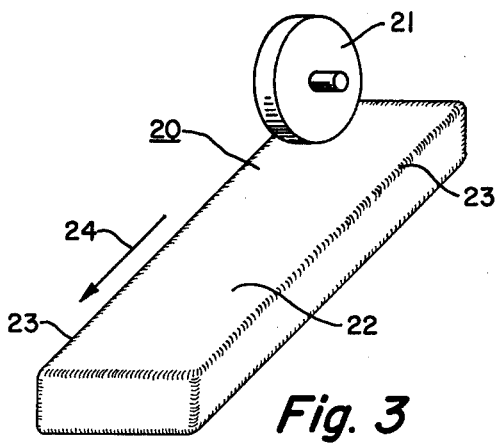
FIG. 3 is a view of a similar ceramic member finished in accordance with the present invention.

FIG. 3 shows, for example, a ceramic member 20 generally similar to the member 10 but produced by the new method. In producing the member 20, it is initially formed by generally conventional means from a suitable material such as silicon nitride or silicon carbide. The material is hot pressed to obtain the desired high density and high strength and is formed to the desired configuration and approximate dimensions. The surface of the member 20 is then machined by diamond grinding or otherwise to the required dimensions. In accordance with the invention, the surface of the member 20 is polished as by burnishing the surface to a highly finish in the range of 3 to 6 RMS. This may be done by mechanically burnishing the surface with a very fine grit diamond grinding wheel as shown at 21, or by diamond lapping sticks or diamond paste embedded in steel wool. This results in a surface 22 which is highly polished and free of the surface cracks, scratches and chip-outs which are characteristic of the conventional finishing operation. In addition, during both the grinding and machining the corners and edges 23 of the member 20 are contoured or rounded off as shown to a relatively small radius which is preferably in the range from 0.010 to 0.020 inch. In this way, no knife-edges result so that no chip-outs occur and there are no notched or serrated edges to cause stress concentrations. In all cases, both the surface burnishing and the edge contouring are performed in the direction in which the maximum tensile stress is to be applied to the member in use which for the member 20 is the longitudinal direction indicated by the arrow 24 in FIG. 3.

It will be seen that a ceramic component produced by this method of finishing results in the virtual elimination of surface faults or defects as described above. In addition, the burnishing of the surface tends to work the material in a manner which creates residual compressive stresses which tend to improve the mechanical and thermal cyclic fatigue strength characteristics. The burnishing also appears to have the effect of relaxing any light localized residual tensile stresses induced by temperature non-uniformities during the grinding process. These effects result from the highly polished surface finish described above which substantially eliminates defects and edge flaws extending transverse to the direction the tensile stress to which the component or member will ultimately be subjected when in use so that most causes of the reduction in effective strength of the ceramic member are eliminated.

Figure 4:
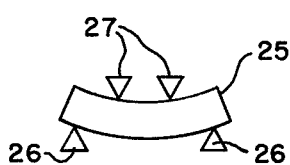
FIG. 4 illustrates a known type of flexural test.
Figure 5:
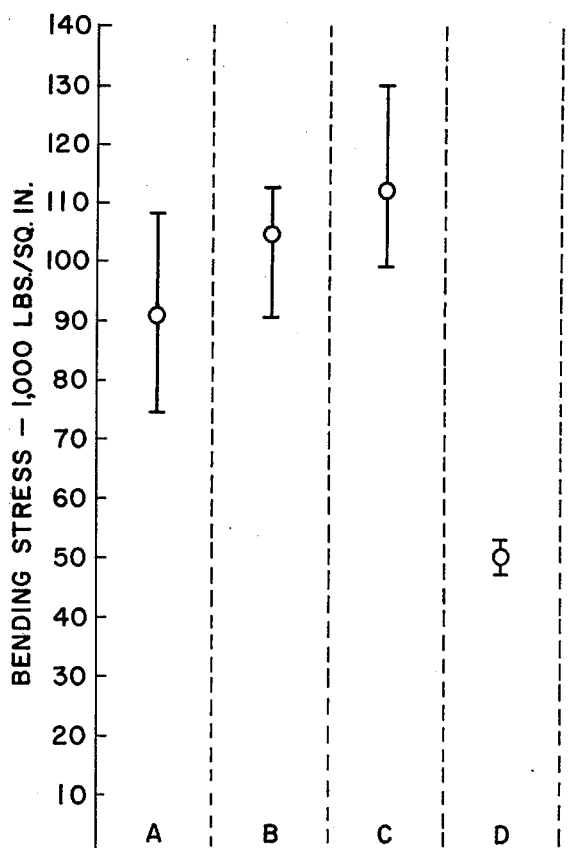
FIG. 5 is a diagram showing the results of comparative flexural tests of ceramic members.

The effectiveness of this surface treatment is illustrated by the comparative test results shown in FIG. 5. These tests were made on rectangular beam specimens of hot pressed silicon nitride of 0.125 inch wide, 0.250 inch high and 1.125 inches long. These specimens were subjected to the standard four-point flexure test illustrated in FIG. 4 in which the specimen 25 is supported on two spaced points 26 and the load is applied at two intermediate points 27, resulting in stressing the lower surface of the specimen in tension. The results of comparative room temperature tests on specimens with varying surface finishes are shown graphically in FIG. 5. Each of the four columns shows the results on a group of specimens finished in the manner indicated at the bottom, and in each case the average fracture strength of the group of specimens is indicated by the circle, the range of values being also indicated. Columns A, B and C show the results in each case of tests of a group of seven specimens while column D shows the results of a group of six specimens.

In column A, as noted at the bottom, the directions of grinding and of finish abrading were longitudinal, i.e., in the direction in which the maximum tensile stress was applied to the specimen. The surface finish, however, was conventional and such that surface defects could occur, while the edges were sharp. The effect of a highly polished surface finish, that is, a finish of 3 to 6 microinches as described above is shown in column B which shows an increase of 15.5% in the average fracture strength as compared to the specimens of column A. In column C, the specimens also had their edges rounded or contoured to a 0.010 inch radius resulting in a total improvement of 23.5% in average fracture strength as compared to the specimens of column A. The adverse effects of transverse grinding and conventional surface finish are shown in column D. These specimens were finished in the conventional manner so that the types of surface defects described above were present, and the finishing operation was carried out transversely to the direction of maximum stress. It will be seen that the average fracture strength of this group of specimens was only about 45% of the average strength obtained with the longitudinally ground specimens of column C which embodied the invention.

It should now be apparent that a high density ceramic has been produced through a method in which a very significant increase in the strength of the material is obtained by finishing the member in such a manner that surface defects such as cracks, scratches and edge flaws transverse to the direction of known tensile stresses to which the member will be subjected in use are virtually eliminated. This eliminates the stress concentrations and residual stresses associated with such defects and makes it possible to utilize the full strength of the material to withstand externally applied tensile forces. A test specimen has been shown as an example of a ceramic member which can be produced in this manner since it is important for test specimens to realize the full strength of the material in order to permit accurate determinations of its true mechanical properties. The method is, of course, applicable to any ceramic product including the gas turbine components previously mentioned or any desired member where strength and high temperature capability are important.

What is claimed is:

1. A high density ceramic rotating air foil component of a turbine subjected during its use to forces resulting in a known direction of tensile stress, said component produced by:

forming ceramic material to the general desired configuration of said component;

surface finishing the surfaces of said component to the desired final dimension including rounding otherwise sharp edges of said configuration with those surfaces extending in said direction of tensile stress being finished by machining said latter named surfaces substantially in the direction of said tensile stress, and;

polishing said latter named surfaces including the edges by burnishing in substantially the direction of said tensile stress.

2. A ceramic turbine component produced according to claim 1 wherein said edges are rounded to a radius in the range of 0.010 and 0.020 inches.

3. A ceramic turbine component produced according to claim 1 wherein said component after burnishing has a surface finish on said latter named surfaces on the order of 3 to 6 RMS, and wherein any resultant micro-size tool marks or scratches on such surfaces generally extend in the direction of said tensile stress.

* * * * *